United States Patent [19]

Maeda

[11] Patent Number: 5,590,036

[45] Date of Patent: Dec. 31, 1996

[54] FAILURE-RECOVERING SEQUENTIAL PROCEDURE TEACHING SYSTEM AND METHOD THEREOF

[75] Inventor: Noboru Maeda, Chiryu, Japan

[73] Assignee: Nippondenso Co., Ltd., Kariya, Japan

[21] Appl. No.: 457,281

[22] Filed: Jun. 1, 1995

[30] Foreign Application Priority Data

Jun. 1, 1994 [JP] Japan ................................. 6-120404

[51] Int. Cl.$^6$ ..................................................... G05B 9/02
[52] U.S. Cl. ................ 364/184; 364/468.01; 364/551.01
[58] Field of Search ..................................... 364/184, 185, 364/186, 187, 468, 550, 551.01, 551.02; 371/48, 67.1, 69.1; 395/181, 182.04

[56] References Cited

U.S. PATENT DOCUMENTS

| | | | |
|---|---|---|---|
| 5,111,383 | 5/1992 | Kimura et al. | |
| 5,166,874 | 11/1992 | Nomaru et al. | 364/184 |
| 5,247,447 | 9/1993 | Korncoff et al. | 364/468 |
| 5,369,569 | 11/1994 | Maeda et al. | |

FOREIGN PATENT DOCUMENTS

| | | |
|---|---|---|
| 1-248206 | 10/1989 | Japan . |
| 2-96205 | 4/1990 | Japan . |
| 4-6962 | 2/1992 | Japan . |
| 5-47843 | 7/1993 | Japan . |

*Primary Examiner*—Roy N. Envall, Jr.
*Assistant Examiner*—Ronald E. Prass, Jr.
*Attorney, Agent, or Firm*—Cushman, Darby Cushman IP Group of Pillsbury Madison & Sutro LLP

[57] ABSTRACT

When a piece of failure occurs, the associated-portion state data items of a relevant equipment and the relevant recovery sequence operated by an operator are recorded as a set of data. At this time, the associated-portion state data items which fall within a plurality of sets of data and which correspond to the same recovery sequence are grouped as the same recovery sequence group. Simultaneously, the common elements to the associated-portion state data items which fall within each recovery sequence group are extracted and recorded as the elements paired with the corresponding recovery sequence. Thereby, when a new piece of failure occurs, relevant associated-portion state data items are compared with the common elements. Then, regarding the associated-portion state data item which coincides with the common element, the corresponding recovery sequence is outputted to teach it to the operator as an available recovery sequence. The failure state data items recoverable with the use of the same recovery sequence are learned by the system per se while analysis is being sequentially performed on the common elements, thereby producing accurate teach sequences with respect to a large number of failure state items by using a small number of data items base.

10 Claims, 10 Drawing Sheets

FAILURE-RECOVERING SEQUENTIAL PROCEDURE TEACHING SYSTEM AND METHOD THEREOF

CROSS REFERENCE TO RELATED APPLICATION

The present application is based on and claims priority from Japanese Patent Application No. Hei 6-120404, filed on Jun. 1, 1994, the contents of which are incorporated herein by reference.

BACKGROUND OF THE INVENTION

1. Field of the Invention

This invention relates to a failure-recovering sequential procedure teaching system for teaching a failure-recovering sequential procedure when a failure occurs in, for example, an automatic production equipment.

2. Description of the Related Art

When a failure occurs in a sequentially controlled automatic production equipment, usually, the equipment is stopped. However, according to the equipment, when the operation of the equipment is stopped, in order to recover the failure from abnormal to normal state, the technique of teaching a failure recovery sequence to an operator or the system for automatically executing the failure recovery sequence has hitherto been proposed in various patents and publications, e.g. in U.S. Pat. No. 5,111,383, Japanese Unexamined Patent Publication No. H. 2-96205, Japanese Unexamined Patent Publication No. H. 3-230202, H. Japanese Unexamined Patent Publication No. H. 5-134719, etc. However, in such a technique or system, since monitoring of failure, classification of failure, and instruction of recovery sequence are performed in a relevant control device, it was necessary that such functions be incorporated in the control device beforehand. As the technique of classifying failures, there has been proposed a technique of dividing the operation of an automatic equipment into operational steps, monitoring the step execution time length by a timer, and classifying the step whose operation exceeds a required time length as an abnormal step, as disclosed in Japanese Unexamined Patent Publication No. H 1-248206 and Japanese Unexamined Patent Publication No. H. 4-6962, or a technique of monitoring the pattern of input/output data in each step while comparing this with normal pattern and classifying the step whose input/output data pattern is out of coincidence with normal pattern as abnormal step as disclosed in Japanese Examined Patent Publication No. H. 5-47843.

However, in such a technique, when control program is designed, it was necessary for each step to be designed so that relevant failure may be exactly grasped, or it was necessary that the control operation be of a system wherein the control operation proceeds to a next controlled step after the performance of the immediately preceding step operation control has been completed. Due to such limitation, it was difficult for such technique to be applied to an arbitrary type of equipment.

SUMMARY OF THE INVENTION

With the conceit in mind that regarding a failure capable of being recovered by the same recovery sequence, the relevant equipment state can also be restricted to substantially the same equipment state as that at the time of the failure, the present invention is intended to provide a failure-recovering sequential procedure teaching system in which the associated-portion state data items at the failure time are sequentially accumulated while they are being classified according to the recovery sequence, the associated-portion state data items are compared with those at the time of each failure occurrence, and thereby a proper recovery sequence with respect to a given type of equipment is taught to the operator while the system per se is performing its learning operation. Further, the present invention is also intended to provide a failure-recovering sequential procedure teaching system which is simple in operational structure and widely available, namely which can teach accurate sequences with respect to a large number of failure state items by use of a smaller scale of data base.

The present invention provides a failure-recovering sequential procedure teaching system which is constructed such that, in the case where when a failure occurs in an equipment to be controlled an operator therefor performs his recovering operation with respect thereto by a series of recovering sequential procedures, the system, when a piece of failure occurs, records as a set of failure removal data associated-portion state data representing as a series of sets prescribed associated-portion states at the time when the equipment to be controlled is in failure and the recovery sequence data representing as a series of sets the recovery sequences operated by an operator, groups one or a plurality of associated-portion state data items corresponding to the same recovery sequence data as the same recovery sequence from among a plurality of sets of failure removal data and compares/analyzes the plurality of associated-portion state data in each recovery sequence group to produce failure-characterizing data including failure state items common to the recovery sequence group and typically representing the characteristics of the relevant failure state that belong to the recovery sequence group, and records the failure-characterizing data as the data paired with the corresponding recovery sequence data, and compares the corresponding associated-portion state data with each item of the failure-characterizing data as stored to determine the degree of match between an item of the corresponding associated-portion state data and the corresponding item of failure-characterizing data as stored and outputs the recovery sequence data corresponding to a high match-degree item of the failure-characterizing data, thereby teaching an available recovery sequence to the operator or a recovery sequence automatically executing device or the like.

The present invention provides a failure-recovering sequential procedure teaching system, which, in the case where when a failure occurs in an equipment to be controlled an operator therefor performs his recovering operation with respect thereto by a series of recovering sequential procedures, when a piece of failure occurs, records as a set of failure removal data associated-portion state data representing as a series of sets prescribed associated-portion states at the time when the equipment to be controlled is in failure and recovery sequence data representing as a series of sets the recovery sequence operated by the operator groups as the same recovery sequence group one or a plurality of associated-portion state data items corresponding to the same recovery sequence data, from among a plurality of sets of failure removal data, and compares and analyzes the associated-portion state data in each recovery sequence group, to produce failure-characterizing data including failure state items common to the recovery sequence group and belonging recovery sequence group and typically representing the characteristics of the relevant failure state, stores the failure-characterizing data as the data paired with the corresponding recovery sequence data, and, when a new piece of failure occurs compares the corresponding associated-portion state data with each item of the failure-characterizing data as stored, to determine the degree of match between an item of the corresponding associated-portion state data and the corresponding item of failure-characterizing data as stored, to output the recovery sequence data corresponding to a high match-degree item of the failure-characterizing data, thereby teaching an available recovery sequence to the operator or to a recovery sequence automatically executing device or the like.

The present invention provides also characterized as follows.

Namely, the teaching system includes a normalization rule for commonizing a plurality of operation steps falling under the relevant recovery operation sequence and, even when such operation steps are different from each other, eventually bringing about the same operation effects, and for causing such commonized operation steps to be represented as a single sequential order operation-step set.

And the recovery sequence data are normalized in accordance with this normalization rule, whereupon each time a new piece of failure occurs, relevant recovery sequences are sequentially classified and stored as those paired with the corresponding recovery sequence data items. This normalization rule is added to the previously set rules and automatically added according to the learned result of the system, thereby promoting the commonization of the recovery sequence data. On the other hand, the system has a function for the systems per se to automatically learn while performing sequential analysis with respect to common elements to the failure state recoverable by use of the same recovery sequence. Thus, a larger number of failure state items are covered by a smaller scale of data base, thereby realizing a simple and widely available failure-recovering sequential procedure teaching system.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

A preferred embodiment of the present invention will be described hereunder with reference to the drawings.

Figure 1:
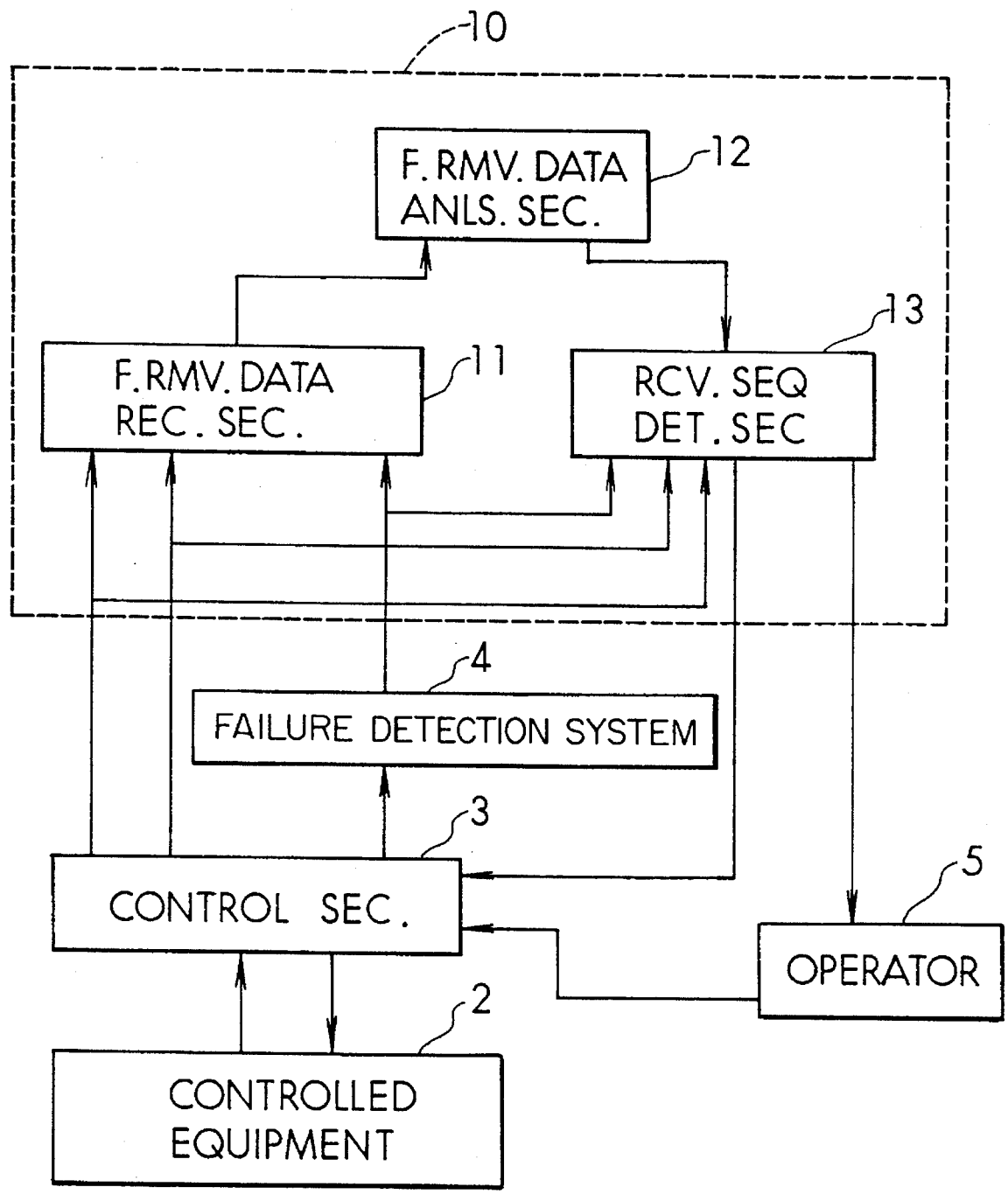
FIG. 1 is a schematic block diagram illustrating a failure-recovering sequential procedure teaching system according to the present invention.

FIG. 1 is a schematic block diagram of an operational-failure recovering sequence teaching system according to the present invention. In FIG. 1, an automatic production equipment 2 such as, for example, a working machine, conveyance machine, or the like is controlled in automatic sequence by use of a control program through the operation of a control section 3, or is manually operated by an operator 5, and, when an operational failure occurs in the production equipment 2, is automatically stopped. A failure detection section 4 detects that a failure occurs when the operation of the equipment 2 is abnormal and generates a failure signal. The detection of this operational failure can be realized, for example, by a method of monitoring the execution time length of each operational step in an automatic equipment by means of a timer and determining the operational step whose operational time length exceeds a prescribed required time length to be in failure. Also, the detection of the operational failure may be performed by being incorporated as part of the control program of the control section 3. The reference numeral 10 represents a failure removal unit which is a characterizing feature of the present invention, and which includes a failure removal data recording section 11, a failure removal data analysis section 12, and a from-abnormal-to-normal recovery sequence determination section 13. The failure removal data recording section 11 records associated-portion state data items which represent as a set of data items the state of prescribed associated portions of the controlled equipment 2, records failure recovery sequence data items which represent as a set of data items the sequential procedures in accordance with which the operator 5 operates, and records as a set of failure removal data items relevant associated-portion state data items and failure recovery sequence data items when one piece of failure occurs, in response to a failure signal indicating the occurrence of a failure. Note that the associated-portion state data items, specifically, are, for example, sequence control data of the control program to be executed by the control section 3, namely, a set of data items that include not only on/off state data items of associated input/output portions and analog input/output value data items but also the data items that represent respective data items of internal memory, counter, register, and the like. When the above-mentioned failure removal data items are supplied to the failure removal data analysis section 12, this analysis section 12 performs grouping as the same recovery sequence group of one or a plurality of associated-portion state data items corresponding to the same recovery sequence data by selecting them from among a plurality of sets of failure removal data items, performs analysis between the associated-portion state data items within each recovery sequence group in regard to each state portion, thereby producing a failure-characterizing data item that indicates a failure state item common to each recovery sequence group and that typically represents a feature of the failure state corresponding to this recovery sequence group, and records such failure-characterizing data item as a data item paired with the corresponding recovery sequence data. Hereinafter, for convenience of explanation, as the necessity arises, the data that includes the recovery sequence data and the failure-characterizing data paired therewith is called "characterizing data". The failure removal data analysis section 12, in order to remove the noises resulting from the operators' habitual operating ways or operators' mis-operations from the recovery sequence, further records in normalized forms the recovery sequence data which are normalized in accordance with normalization rules for re-arranging the order of operations, for omitting unnecessary operations, or for replacing a plurality of operation sequence chains having the same effect by a standard operation sequence chain. Further, the normalization rules include a rule which, in case that the characterizing data concerning a certain recovery sequence includes the characterizing data concerning another recovery sequence, converts this another recovery sequence to the former certain recovery sequence, thus having an additional function to operationally combine the both recovery sequences with each other and merge said another recovery sequence into the former certain recovery sequence. It is to be noted that another arrangement may be used in which the recording section 11 and the analysis section 12 are operationally combined with each other to thereby sequentially analyze the data that have been recorded. When a new piece of failure occurs, the recovery sequence determination section 13 compares the associated-portion state data items involved with the data-item contents of the characterizing data as recorded. Then, regarding the failure state portion data items in the characterizing data, examination is performed as to the degree of match between prescribed associated-portion state data items, and, regarding the prescribed associated-portion state data item or items which are high in the degree of match, the recovery sequence data corresponding to the relevant recovery sequence group are outputted to teach it to the operator 5 as his available recovery sequence.

Figure 2:
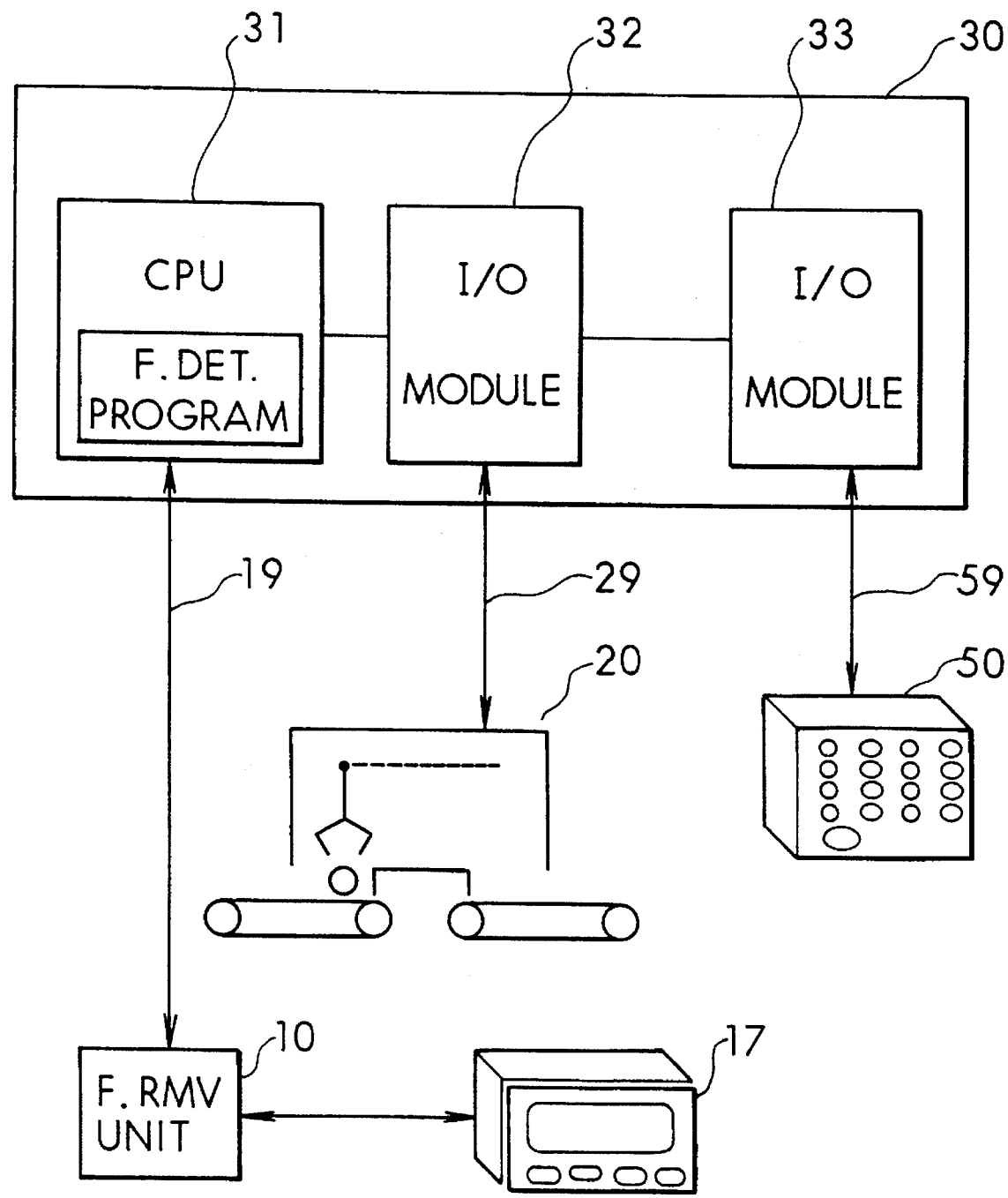
FIG. 2 is a block diagram illustrating an embodiment, wherein, the present invention is combined with a loader unit.

Next, an embodiment of the present invention in which the present invention has been applied to a loader unit as a controlled equipment will be described with reference to FIG. 2. A loader unit 20 is connected to an input/output module 32 of a control unit 30 by a plurality of input/output signal lines 29. The control unit 30 comprises a CPU module 31 and input/output modules 32 and 33. A failure detection program that serves as a failure detection section 4 is contained in the CPU module 31. In addition, the failure detection section 4 may be added to within the CPU module 31 in the form of a hardware unit, or may be added as a module to a PC (programmable controller) rack of the control unit 30, or may be installed as a module independent of the PC rack. The failure removal unit 10 is connected to the CPU module 31 of the control unit 30 via signal lines 19 and, on the other hand, is connected to a failure removal terminal 17 that serves as a teaching means. Further, an operation board 50 is connected to the input/output module 33 of the control unit 30 by a plurality of input/output signal lines 59.

Figure 3:
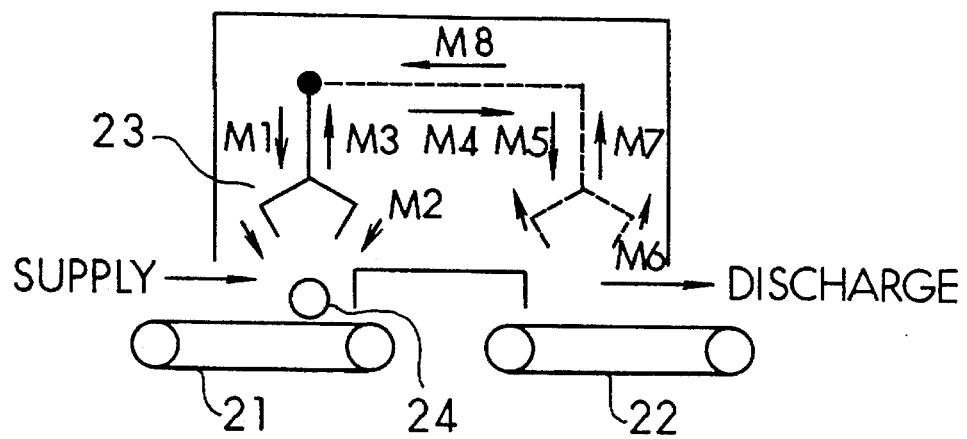
FIG. 3 is a schematic linear diagram illustrating the operation of the loader unit.
Figure 4:
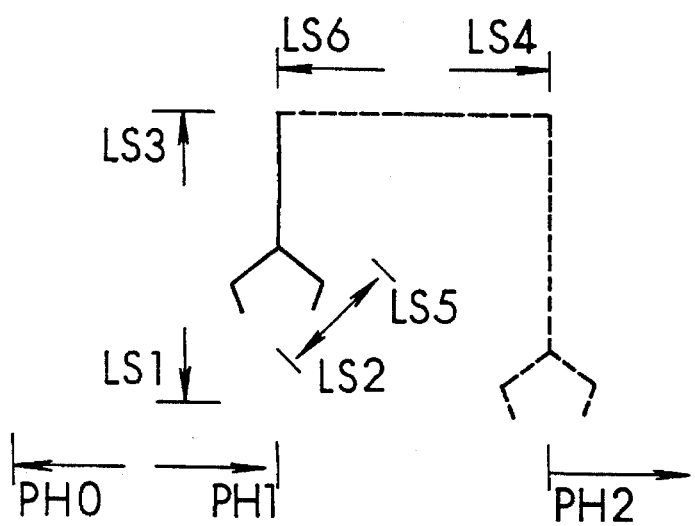
FIG. 4 is an operational linear diagram illustrating confirmation sensors of the loader unit.
Figure 5:
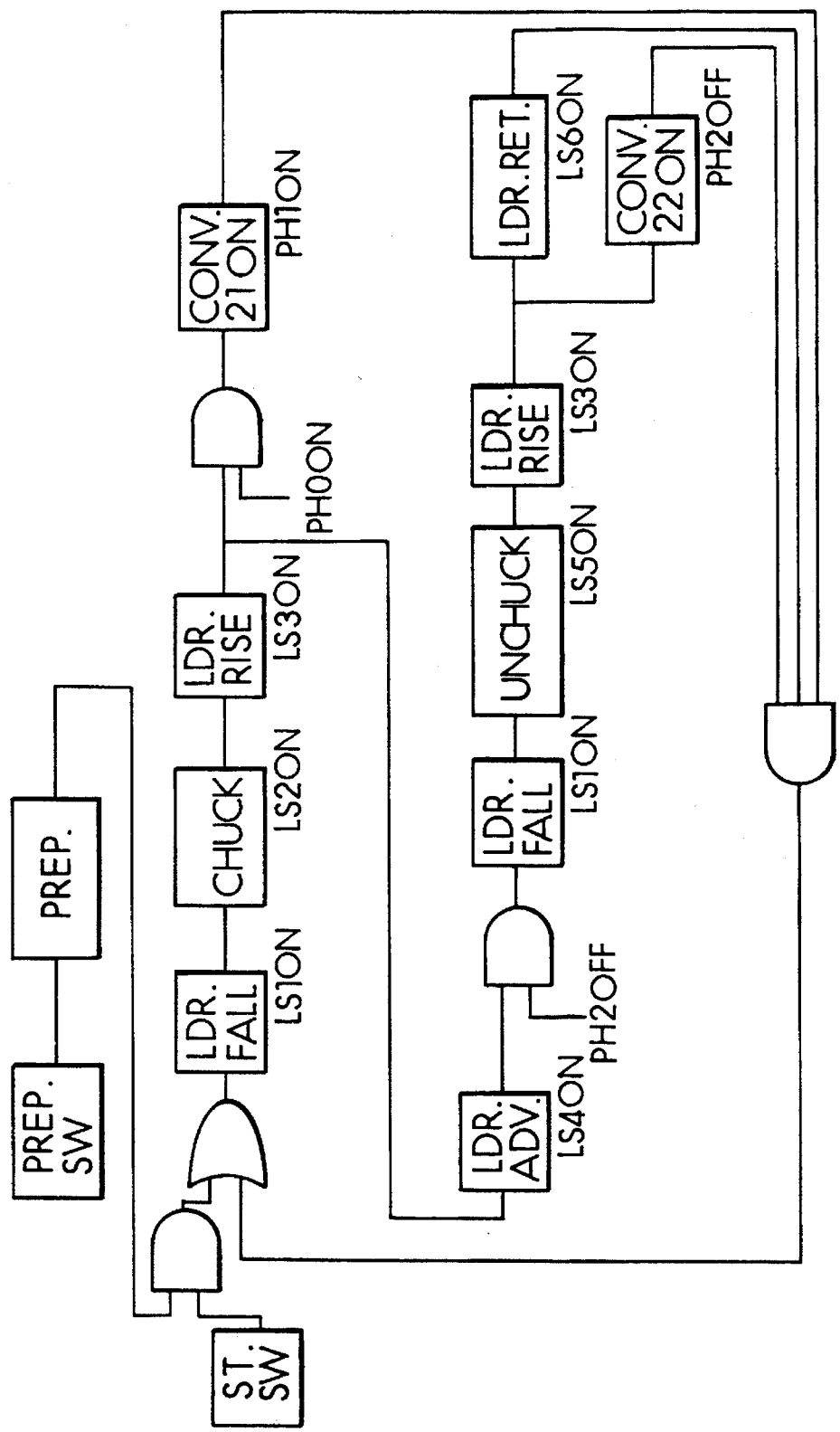
FIG. 5 is an operational diagram illustrating the operational sequence of the loader unit.

Next, the construction and operation of the loader unit 20 to which the failure recovery sequence teaching system is applied will be explained. FIG. 3 illustrates the operation of the loader unit, FIG. 4 illustrates operational limits for operation of relevant associated-portion confirmation sensors (limit switch, for example) of the loader unit, and FIG. 5 illustrates the flow of the loader-unit run operation. For brevity, an explanation will hereinafter be given by using the same symbols with respect to the symbols that represent sensor per se and the symbols that represent sensor installation places. The preparation for the run operation of the loader unit 20 is performed as follows. When an object 24 is placed on a starting end of a supply conveyor 21, the presence of the object 24 is confirmed at the position PH0 whereby the supply conveyor 21 is operated. Thus, the object 24 is supplied up to the position PH1 and reaches the position PH1, whereupon a sensor PH1 is turned on for making preparation for the performance of an automatic sequential control operation for a loader 23. When the sequential operation for the loader unit is started, firstly the loader 23 is lowered (operation M1), and, when a sensor LS1 is turned on, chucks the object 24 (chuck, operation M2). Then, when a sensor LS2 is turned on, the loader 23 is raised (operation M3). Then, when a sensor LS3 is turned on, the upward movement of the loader 23 is stopped and this loader 23 starts to move forward (operation M4). Thus, when the sensor PH0 is turned on by a next object, the supply conveyor 21 is operated (which is stopped when the sensor PH1 is turned on). Each of the succeeding operations proceeds to a next step while the completion thereof is confirmed by a relevant sensor. And the loader 23 is returned to its original position by tracing a sequence of LS4-on, loader fall (M5), LS1-on, unchuck (M6), LS5-on, loader rise (M7), LS3-on, loader retreat (M8) with a discharging conveyor 22 being simultaneously operated (which is stopped when a sensor PH2 is turned off), and LS6-on. Note that it is assumed that the loader 23 contain an actuator such as, for example, a motor, a cylinder and the like for performing the operation of the loader.

The above-mentioned operational steps can be expressed as a list as follows.

TABLE 1

| Operation Symbols | Operation Contents | Confirming-Sensor Operation When the Operation Completes |
|---|---|---|
| M1 | Loader Fall | LS1-On |
| M2 | Chuck | LS2-On |
| M3 | Loader Rise | LS3-On |
| M4 | Loader Advance | LS4-On |
|  | Supply Conveyor Run | PH1-On |
| M5 | Loader Fall | LS1-On |
| M6 | Unchuck | LS5-On |
| M7 | Loader Rise | LS3-On |
| M8 | Loader Retreat | LS6-On |
|  | Discharge Conveyor Run | PH2-Off |

Further, the operational position of each confirming sensor is listed as follows.

TABLE 2

| Sensor Symbol | Confirmation Positions |
|---|---|
| Ls1 | Falling End of Loader |
| LS2 | Chuck End |
| LS3 | Rising End of Loader |
| LS4 | Advancing End of Loader |
| LS5 | Unchuck End |
| LS6 | Retreating End of Loader |
| PH0 | Object Confirmation |
| PH1 | Object Supply Confirmation |
| PH2 | Object Discharge Confirmation |

Next, the construction and operation of the failure removal unit 10 which is a characterizing feature of the present invention will be explained. The system wherein the time length from the collapse of a state, corresponding to the LS3-on and LS6-on state, i.e. original position of the loader 23 to the next restoration of this state is monitored by a timer as part of the control program and, when that time length exceeds a prescribed limit value, supplies a failure signal to the failure removal unit 10 is adopted as an example of the failure detection technique. In order to more finely discriminate, a technique of timer monitoring a time limit of from the start to the end of each operational step in operational-step units with such a time limit being previously set for each operational step can also be adopted.

It is assumed for brevity that the failure removal data recording section 11 do not record output-contact state data, counter state data, register state data, etc. therein as the associated-portion state data but read associated-confirming-sensor state data of each relevant confirming sensor provided with respect to the loader unit 20 by the input/output module 32 and record therein such state data as associated-portion state data at the time of a failure. For example, in case that the loader 23 fails to sufficiently chuck the object, the sensor LS2 remains turned-off and the loader 23 is kept stopped in the chuck step. Therefore, the associated-portion state data which represent the state of the relevant associated portions are expressed as in Table 3 below.

TABLE 3

| Sensor/Symbol | Confirmation/Position | Contents of the Associated-Portion State Data |
|---|---|---|
| LS1 | Loader-Fall End | 1 |
| LS2 | Chuck End | 0 |
| LS3 | Loader-Rise End | 0 |
| LS4 | Loader-Advance End | 0 |
| LS5 | Unchuck End | 0 |
| LS6 | Loader-Retreat End | 1 |
| PH0 | Object Confirmation | 0 |
| PH1 | Object Supply Confirmation | 1 |
| PH2 | Object Discharge Confirmation | 1 |

(In the table, the numerals 1 and 0 enumerated under the item "Contents of the Associated-Portion State Data" are on and off, respectively)

In contrast, when the operator conducts his recovering operation by using an operation board, each of his recovering operations is read into the CPU module 31 via the input/output module 33 and further is recorded in the failure removal data recording section 11 within the failure removal unit 10. Since equipment-safety-cover opening and closing signals for example represent the start and termination of the manual operations, they are similarly recorded. These recording operations are performed until an automatic-operation starting button on the operation board is depressed. After it has been confirmed that the automatic operation has been normally re-started, the above-mentioned operator's recovering operation sequence is recorded as a recovery sequence. Accordingly, in the case of the above-mentioned chuck failure, the following recovery sequence data for example are recorded.

TABLE 4

| Operation/Sequence | Contents of Button Operations | Note |
|---|---|---|
| 1 | Unchuck | |
| 2 | oader Rise | |
| 3 | Failure Recovery | Indicates that failure has been recovered (this button should be finally pushed, properly.) |
| 4 | buzzer Silencing | Turn off the failure alarm |

TABLE 4-continued

| | | informing buzzer |
|---|---|---|
| 5 | Manual Operation | Re-dispose the object properly |
| 6 | Loader Fall | |
| 7 | Chuck | |
| 8 | Loader Rise | |
| 9 | Loader Advance | |
| 10 | Supply Conveyor Run | |
| 11 | Loader Fall | |
| 12 | Unchuck | |
| 13 | Loader Rise | |
| 14 | Discharge Conveyor Run | |
| 15 | Loader Retreat | |
| 16 | Start of Automatic Operation | |

With the above-mentioned associated-portion state data in Table 3 being paired with the recovery sequence data in Table 4, the paired both data are recorded as failure removal data into the failure removal data recording section 11 within the failure removal unit 10.

The failure removal data analysis section 12 performs the following failure analysis according to the failure removal data.

Firstly, the normalization of the operational sequence will be explained. The "normalization" which is referred to in this portion of the specification is to uniformize various expressions of the sequence operations which represent substantially the same result to a typical expression. When recovery sequence data are recorded in regard to the recovery processing, a normalization rule is applied to such recovery sequence data and conversion processing is performed with respect thereto, thereby standardizing the recovery sequence. For example, it is now assumed that the following normalization rules be set beforehand by an equipment designer or another. Here, the normalization rule is described in accordance with the BNF notation method. The wording parenthesized by ⌈ ⌋ indicate an operation, and the wording parenthesized by ◇ indication an operational sequence, i.e., operational-sequential procedure. The operation that is included in each of the operational sequences is sequentially executed from left to right. Although in each rule the same-wording sequence represents the same sequence, between different rules the same-wording sequence does not always represent the same sequence. The meaning of each symbol is as follow.

TABLE 5

← indicated that the right sequence is normalized into the left sequence.
\*    indicates that the operation or sequence that immediately precedes this symbol is repeated a given number of times.
|    indicates that the right or left sequence is used.
φ    indicates that nothing is done.

In this case, each rule set beforehand is as follows.

TABLE 6

[rule 1] Order-reversible button operation
    1. ⌈supply conveyor operation⌋ ⌈loader advance⌋
       ←⌈loader advance⌋ ⌈supply conveyor operation⌋
    2. ⌈loader retreat⌋ ⌈discharge conveyor operation⌋
       ←⌈discharge conveyor operation⌋ ⌈loader retreat⌋
[rule 2] Order-free button operation

TABLE 6-continued

1. ⌈buzzer silencing⌋ <given sequence 1> <given sequence 2> ← <given sequence 1> ⌈buzzer silencing⌋ <given sequence 2>
2. <given sequence 1> <given sequence 2> ⌈failure recovery⌋ ⌈automatic operation start⌋ ← <given sequence 1> ⌈failure recovery⌋ <given sequence 2> ⌈automatic operation start⌋

[rule 3] Unnecessary operation
1. <given button-operation> ← <given button-operation> *
2. φ ← ⌈loader rise⌋ ⌈loader fall⌋ | ⌈loader fall⌋ ⌈loader rise⌋ | ⌈loader advance⌋ ⌈loader retreat⌋ | ⌈loader retreat⌋ ⌈loader advance⌋

[rule 4] Other operation having the same effect than the above-mentioned operations
1. ⌈return to origin⌋ ← ⌈loader rise⌋ ⌈loader back⌋

In addition to the above-mentioned rules, as later described, new rules are produced in the process of analysis of the failure removal data and automatically added. These new rules are applied to relevant recovery sequence data to provide normalized recovery sequences. When these recovery sequences are normalized, each of the new rules is applied to its relevant recovery sequence data in the sequential order in which the relevant recovery sequence data are arranged in the rule. This normalization operation is repeated until the relevant recovery sequence data applied no further exist. Thus, in the example of the above-mentioned chuck failure, the following normalization is performed.

TABLE 7

| Sequential Operation-Order | Contents of Button Operation |
| --- | --- |
| 1 | buzzer silencing |
| 2 | unchuck |
| 3 | loader rise |
| 4 | manual operation |
| 5 | loader fall |
| 6 | chuck |
| 7 | loader rise |
| 8 | supply conveyor operation |
| 9 | loader advance |
| 10 | loader fall |
| 11 | unchuck |
| 12 | return to origin |
| 13 | discharge conveyor operation |
| 14 | failure recovery |
| 15 | start of automatic operation |

By combining the above-mentioned normalized recovery sequence data items with their corresponding associated-portion state data items into one set of data, such one set of data is set to be failure removal data. If another piece of failure next occurs and the recovering operation is performed with respect thereto, then the combined data of the recovery sequence data and the relevant associated-portion state data are similarly set to be another one set of data. In this case, if even when the relevant associated-portion state data are different the resulting recovery sequence data are in coincidence with already existent recovery sequence data, such relevant associated-portion state data are grouped into a group of the already existent recovery sequence data.

Next, extraction of the failure-characterizing data will be explained. If, as mentioned above, a plurality of sets of associated-portion state data are each made to fall under the same recovery sequence data, the associated-portion state data items are classified into data items connected with failure (on/off of the sensor contact-point) and data items not connected with failure (on/off of the sensor contact-point) to thereby produce failure-characterizing data. If it is assumed that the failure-characterizing data corresponding to each recovery sequence group could be extracted by linear operation, then the classification between the data items connected with failure and the data items not connected with failure can be performed by logical operation. For convenience of the logical operation, an explanation will be given by using a vector whose element is each one of the data items composing each one set of data. A data base for the characterizing data (P, f, m) that is composed of a normalized recovery sequence vector P whose element is each step in the normalized recovery sequence that has been recorded when several pieces of failure occurs up to now and each time one of the relevant recovery operations is performed, a failure state vector f whose element is each associated-portion state data item having relevancy to the failure judgement at the time of a failure, and a mask vector m for excluding data items not connected with failure from such associated-portion state data items is prepared. While using this data base, data processing is performed in accordance with the flowchart of FIG. 6. This operation is an automatic learning function of the system per se which characterizes the present invention.

Figure 6:
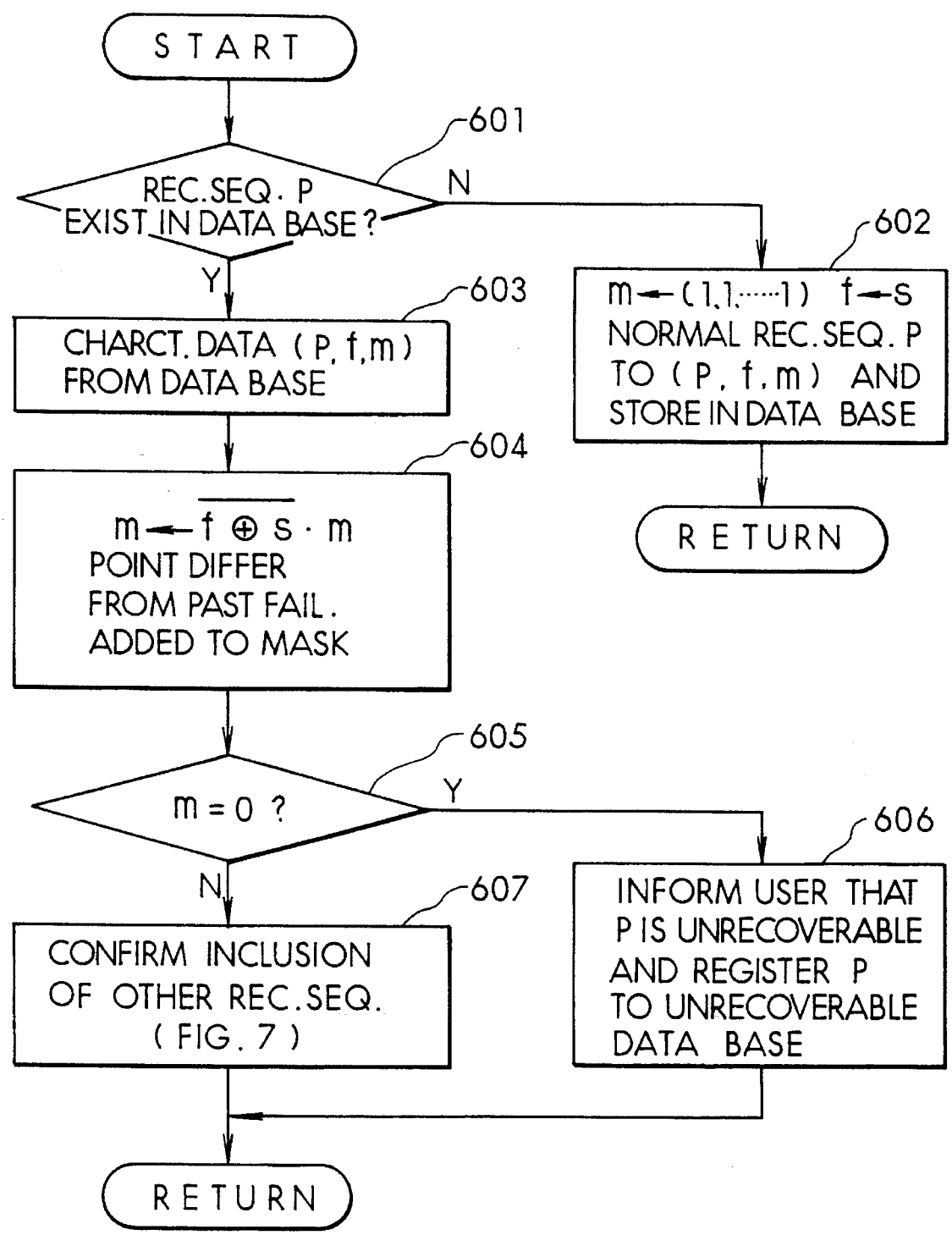
FIG. 6 is a flowchart showing an automatic learning process performed in the present invention.

The process of preparing a failure recovery data base will now be explained with reference to FIG. 6. When a failure recovery processing is performed and a normalized recovery sequence data item P and a state vector s representing the associated-portion state data item at the time of a relevant failure are inputted, it is investigated and determined whether or not the recovery processing has ever been performed. If the recovery processing has never been performed, the relevant data items are newly registered into the data base which, in turn, is updated. Firstly, it is determined in step 601 whether or not the present recovery sequence data item P exists in the data base. If no such data item exists therein, the operation proceeds to step 602. In this step 602, the mask vector m all elements of which are 1 is produced and the failure state vector f is set to be the state vector s, this state vector s being set to be in corresponding relation to the normalized recovery sequence data item P, whereby those data items are unified as a set of characterizing data (P, f, m) and stored in the data base. If the recovery sequence data item P exists in the data base, the corresponding existent characterizing data is taken out as a set of characterizing data (P, f, m) from the data base (step 603). Then, the existent mask vector m is multiplied by the negation of an exclusive OR between the existent failure state vector f and the present state vector, whereby the mask vector m is newly set to be this existent mask vector thus multiplied (step 604). By this calculation, the relevant element portion whose data items differ from each other between f and s has a vector element of 0. Therefore, among the elements of the mask vectors m, the element which is not characteristic of the failure recovered by the recovery sequence data item P is replaced by 0. Namely, the mask vector m is a vector which represents whether or not the relevant element is characteristic in determining whether or not the failure can be recovered by such recovery sequence data item P. In case that as a result of the execution of the above-mentioned calculation all elements of the mask vector m has become 0 (step 605), this means that a failure which is completely different from the experienced pieces of failure has been recovered according to the same recovery sequence. Namely, since there exists no characteristic element which serves to determine whether or not the relevant failure should be recovered by the corresponding recovery sequence vector P, the failure corresponding to this recovery sequence P can not be recovered according to this teaching system of recovery sequence. Then, this finding is informed to the user and, on the other hand, the relevant recovery sequence P is registered in the unrecoverable failure data base (step 606). In case that the mask vector m has a remaining element of 1, the operation proceeds to step 607. In this step, in order to enhance the use efficiency of the data base, the inclusion relationship between this relevant recovery sequence P and another recovery sequence is confirmed (which will be described later with reference to FIG. 7).

Figure 9:
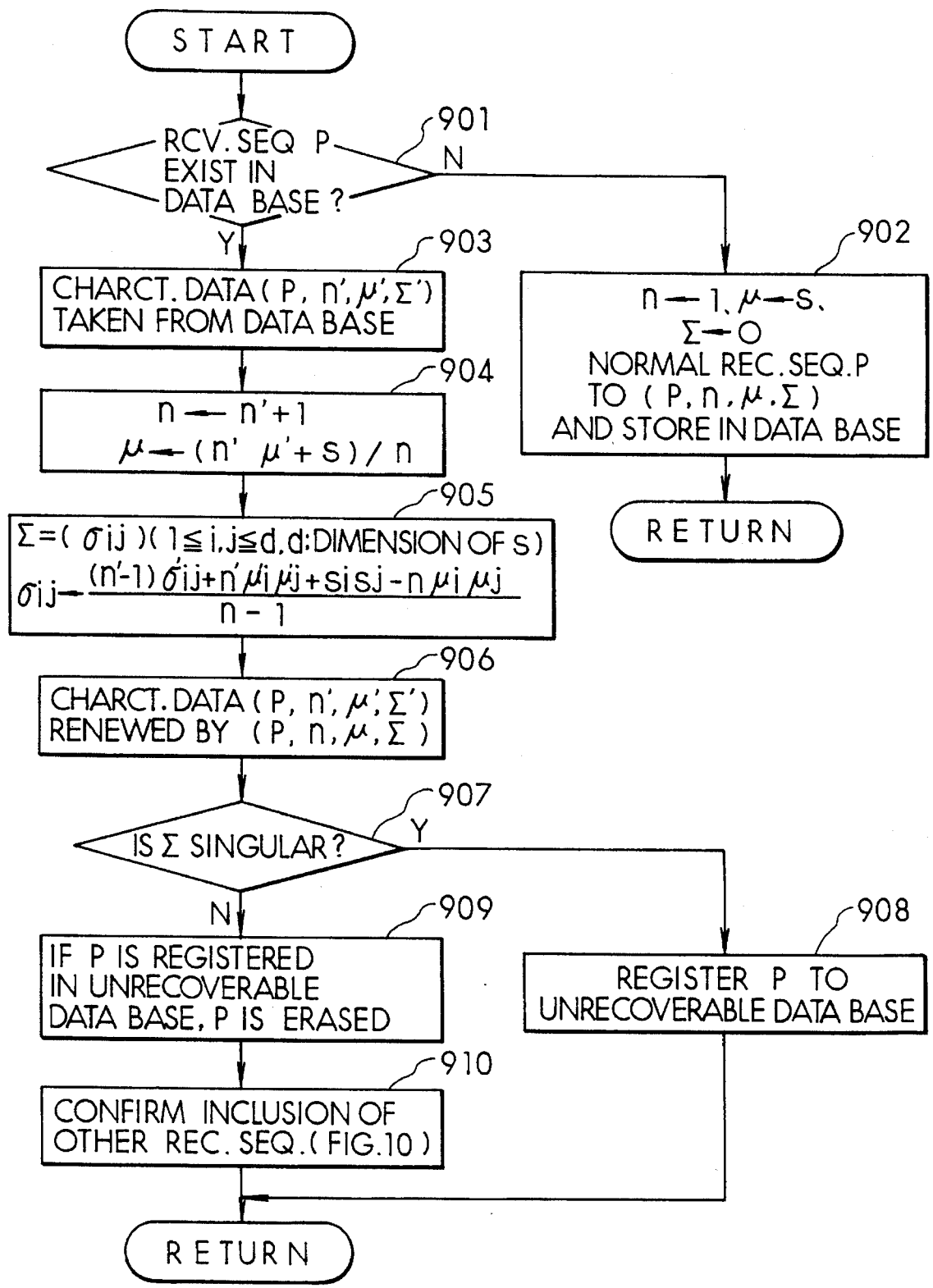
FIG. 9 is a flowchart showing another automatic learning process performed in the present invention.
Figure 10:
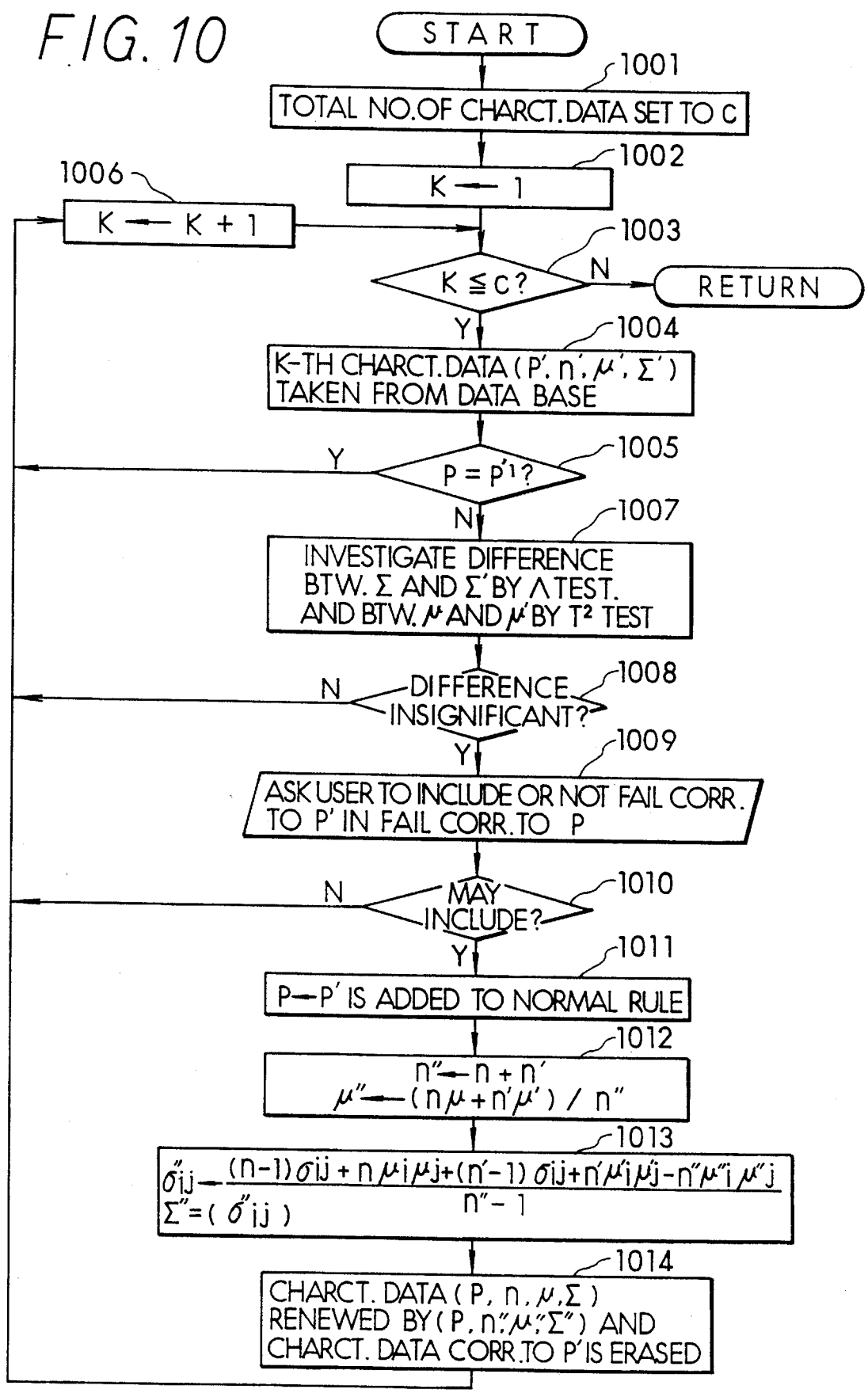
FIG. 10 is a flowchart showing the contents of a part of the flowchart shown in FIG. 9.
Figure 11:
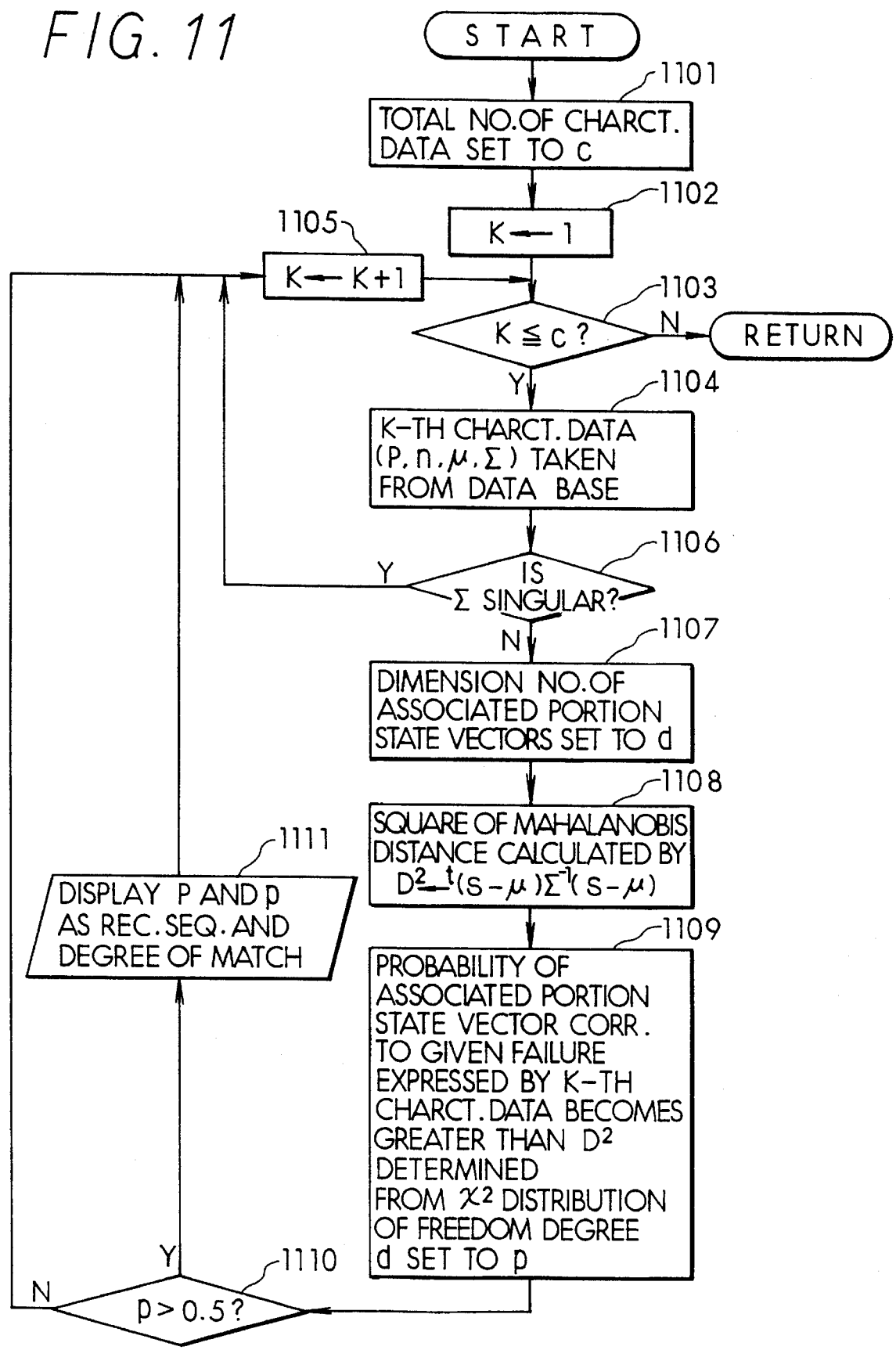
FIG. 11 is a flowchart showing another failure-recovering sequential procedure teaching process performed in the present invention.

Note that, in case of an equipment in which unrecoverable pieces of failure are too many, improvement should be conducted such as, for example, adoption of a later-described multivariable statistical analysis technique as a relevant program (FIGS. 9 to 11). If the failure state vector f with respect to the recovery sequence P is finally determined as mentioned above, only if when a piece of failure occurs the user finds out the failure state vector f coinciding with a vector obtained by multiplying the associated-portion state vector s at that time by the mask vector m, it results that the recovery sequence P corresponding to such f is a recovery sequence that can recover such piece of failure.

Assume that in the above-mentioned example of chuck failure the pieces of failure which have already been recovered by applying the same normalized recovery sequence occurred several times in the past and the failure state vector f and the mask vector m be already determined as in Table 8 below. Then, by applying the present associated-portion state data items (the above-mentioned table 1) to the flowchart of FIG. 6, the f and m are updated as in Table 9 below.

TABLE 8

| Sensor/Symbol | Confirmation/Position | f | m |
|---|---|---|---|
| LS1 | Loader Fall End | 1 | 1 |
| LS2 | Chuck End | 0 | 1 |
| LS3 | Loader Rise End | 0 | 1 |
| LS4 | Loader Advance End | 0 | 1 |
| LS5 | Unchuck End | 0 | 1 |
| LS6 | Loader Retreat End | 1 | 1 |
| PH0 | Object Confirmation | 0 | 0 |
| PH1 | Object Supply Confirmation | 1 | 1 |
| PH2 | Object Discharge Confirmation | 0 | 1 |

TABLE 9

| Sensor/Symbol | Confirmation/Position | f | m |
|---|---|---|---|
| LS1 | Loader Fall End | 1 | 1 |
| LS2 | Chuck End | 0 | 1 |
| LS3 | Loader Rise End | 0 | 1 |
| LS4 | Loader Advance End | 0 | 1 |
| LS5 | Unchuck End | 0 | 1 |
| LS6 | Loader Retreat End | 1 | 1 |
| PH0 | Object Confirmation | 0 | 0 |
| PH1 | Object Supply Confirmation | 1 | 1 |
| PH2 | Object Discharge Confirmation | 0 | 0 |

Figure 7:
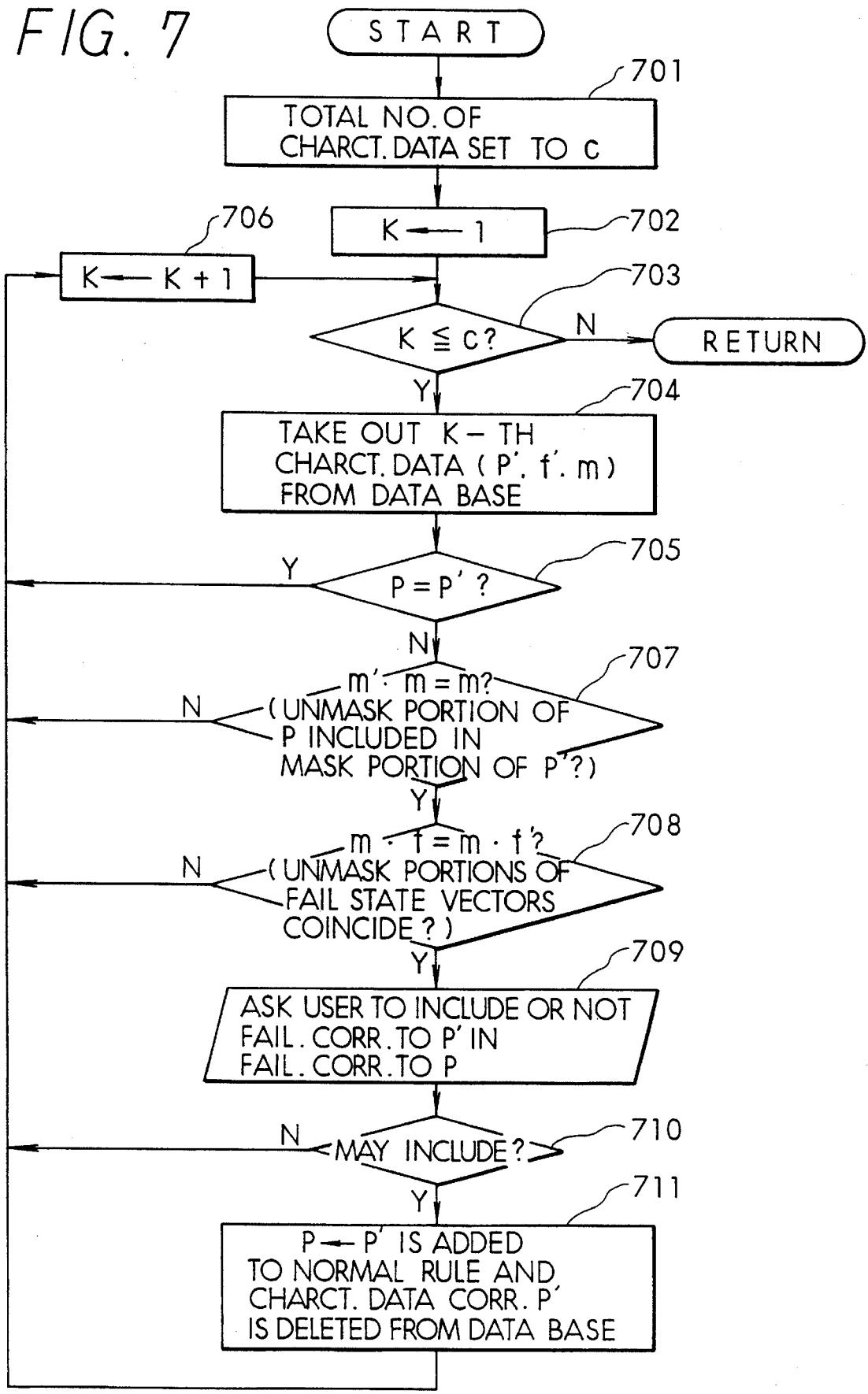
FIG. 7 is a flowchart showing the contents of a part of the flowchart shown in FIG. 6.

Subsequently, the confirmation of the inclusion relationship which serves as a preferable additional function for the purpose of enhancing the use efficiency of the data base will now be explained with reference to FIG. 7. This inclusion relationship is directed to providing a technique of, using the now determined characterizing data-item set including the normalized recovery sequence P, replacing an existent characterizing data-item set included therein by the now determined characterizing data-item set. By the performance of the process steps 701 to 706, the now determined characterizing data-item set (P', f', m') corresponding to other recovery sequence P' than the normalized recovery sequence P is sequentially taken out from the data base. Namely, regarding each of a total number c of characterizing data-item sets (P', f', m') investigation and determination are sequentially made on each of the first to the c-th characterizing data-item set. Subsequently, in step 707, it is determined whether or not the associated-portion state data-items corresponding to the m element 1 are all 1 in case of the m' element. Namely, it is determined whether or not the mask vector m' can be replaced by the mask vector m. In step 708, regarding the element 1 of m, it is determined whether or not the element content of f is in coincidence with the element content of f' (1 or 0). Namely, it is determined whether or not the relevant failure state corresponding to the now determined characterizing data-item set is in coincidence with the previous failure state corresponding to the existent previously determined characterizing data-item set. If the above-mentioned requirements are met, it means that the failure that can be recovered by the recovery sequence P' can be always recovered by the recovery sequence P through coincidence between the both failure-characterizing data items. In step 709, the system asks the user whether or not the failure removal realized by the existent recovery sequence P' may be replaced by the failure removal processing realized by the new recovery sequence P. If the answer is yes (step 710, the rule for converting P' to P is added to the previously mentioned standardizing rule and the characterizing data-item set corresponding to the existent recovery sequence P' in the data base is deleted (step 711) and instead the failure removal characterizing data-item set corresponding to the new recovery sequence P is stored into the data base.

Consider now a case wherein a new piece of failure occur and as a result the following associated-portion state data items such as those in Table 10 below have been supplied.

TABLE 10

| Sensor/Symbol | Confirmation/Position | Contents of the Associated-Portion State Data |
|---|---|---|
| LS1 | Loader Fall End | 1 |
| LS2 | Chuck End | 0 |
| LS3 | Loader Rise End | 0 |
| LS4 | Loader Advance End | 0 |
| LS5 | Unchuck End | 0 |
| LS6 | Loader Retreat End | 1 |
| PH0 | Object Confirmation | 1 |
| PH1 | Object Supply Confirmation | 1 |
| PH2 | Object Discharge Confirmation | 0 |

Figure 8:
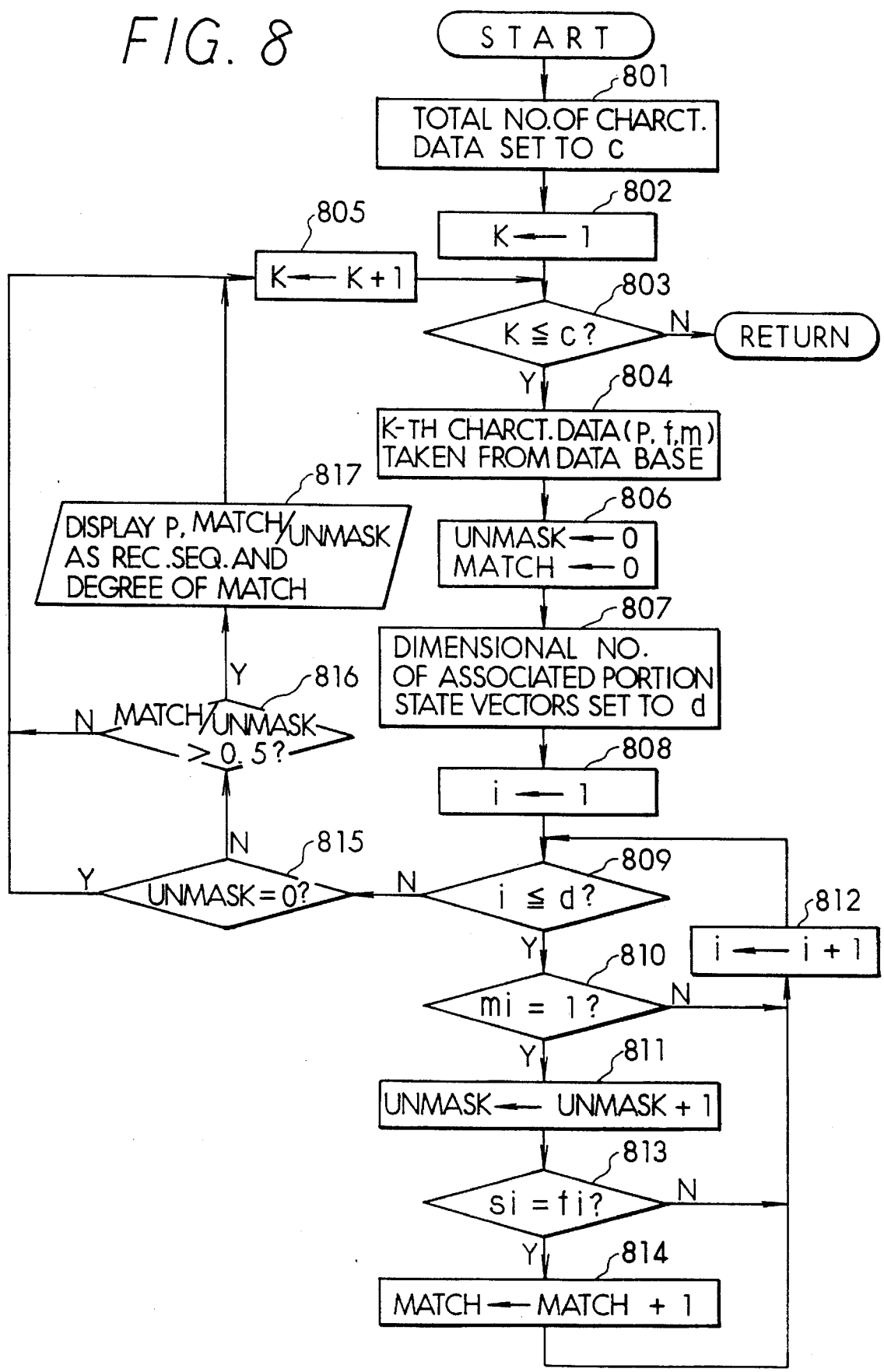
FIG. 8 is a flowchart showing a failure-recovering sequential procedure teaching process performed in the present invention.

In this case, it is assumed that the characterizing data items learned from the past occurrence of failure be registered as in Table above. Then, the processing according to the flowchart of FIG. 8 is performed in the recovery sequence determination section 13 as follows. This processing is directed to searching for the existence of a recovery sequence in the data base which may be determined as being available for the user, and, if such a recovery sequence exists, teaching such recovery sequence to the user. In the process steps of from step 801 to 805, a c-number of characterizing data-item sets in the data base are sequentially taken out from the first to the c-th data-item set and investigation and determination are conducted on each of them. In the process steps of from step 806 to 812, as regards the characterizing data-item set (P, f, m), the items each having a mask m element of 1 (mi is the i-th element of m) are counted. And in the process steps of from step 812 to step 814, the items whose mask element is 1 and whose now state vector s element matches with a registered state vector f element are counted. If there exists an item in which s matches with f (step 815), regarding the items whose mask m element is 1 the degree of match of s with respect to f and, if s/f is larger than 0.5 (step 816), the relevant recovery sequence is taught to the user as an available recovery sequence (step 817). If there exists no such item, investigation and determination are sequentially conducted on another characterizing data-item set. The degree of match of the present state vector in Table 10 with respect to that in Table 9 is 7/7=1, and the recovery sequence in Table 7 is displayed as an available recovery sequence.

Although in the above-mentioned example only the on/off state of the input/output operation has been handled as the associated-portion state data items, if it is desired as another embodiment to also add analog values to the associated-portion state data items, it is possible to determine an available recovery sequence by discrimination analysis which is a multivariable statistical analysis technique, with such analog values, on/off state data items (1 or 0), composing sample variables, and normalized recovery sequence being grouped as a set of data. By this technique of determination, it is possible to teach a suitable level of recovery sequence. This technique of recovery sequence can be also used for enhancing the learning capability in the case of handling the on/off state data item only. In case that a standard distribution function is used for the probability density function, the FIGS. 6, 7, and 8 in which illustration is made of the algorism used in the above-mentioned embodiment may be replaced by the FIGS. 9, 10, and 11, respectively. In this case, learning and teaching of the recovery sequence can be performed in a similar manner to that mentioned above. The processing performed in that case will be explained hereunder while referring to the flowcharts involved. The embodiment is characterized by the respect of using a technique that utilizes a set of data, composed of the frequency n at which pieces of failure occurs in corresponding relation to the normalization sequence P, failure state average vector $\mu$, and failure state variance covariance matrix $\Sigma$, as the characterizing data.

First, the production processing of the failure recovery data base will be explained with reference to FIG. 9. When failure recovery is performed and a state vector s representing the associated-portion state data items at the failure time is supplied along with the normalized recovery sequence vector P, it is investigated and determined whether or not the relevant recovery processing has ever been performed. If such recovery processing has never been performed, the relevant data items are newly registered in the data base which, in turn, is updated. First, in step 901, whether or not the present recovery sequence P exists in the data base is investigated. If the present recovery sequence P does not exist, the operation proceeds to step 902. In this step, the failure occurrence frequency n, failure state average vector $\mu$, and the failure state variance covariance matrix $\Sigma$ are temporarily set to be 1, s, and 0 (zero matrix), respectively, these data items being set to be in corresponding relation to the normalized recovery sequence P, and stored in the data base as a set of data that composes the characterizing data (P, n, $\mu$, $\Sigma$). If the present recovery sequence P exists in the data base, the relevant already existent set of characterizing data (P, n', $\mu$', $\Sigma$') are taken out from the data base in step 903. Specifically, in step 904, 1 is added to n' whereby n is set to be (n'+1). Simultaneously, calculation of (n'$\mu$'+s)/n is performed whereby $\mu$ is set to be (n'$\mu$'+s)/n. In subsequence, in step 905, the failure state variance covariance matrix $\Sigma$ is calculated. Note here that the matrix $\Sigma$ is a d-dimensional square matrix ($\delta$ij) (d represents the dimensional number of s). Each element $\delta$ij is determined as $\delta$ij=(n'−1)$\delta$'ij+n'$\mu$'i$\mu$'j+sisj−n$\mu$i$\mu$j)/(n−1). Note also that $\delta$'ij represents the (i)th row/(j)th column (1≦i, j≦d) element of $\Sigma$' while, on the other hand, $\mu$'j, $\mu$i, and si represent (i)th element of $\mu$', $\mu$, and s (the subscript (j) represents the (j)th element). As a result, in step 906, the characterizing data (P, n', $\mu$', $\Sigma$') in the data base are updated by the present characterizing data (P, n, $\mu$, $\Sigma$). In this case, if the matrix $\Sigma$ is singular matrix (step 907), since with the use of even this technique the relevant failure can not up to the present be determined to be recovered by this sequence P, the relevant set of characterizing data are registered in the unrecoverable failure data base (step 908). If the matrix $\Sigma$ is a nonsingular matrix, the relevant failure is determined as being recoverable. Thus, the operation proceeds to step 909. In this step, whether or not the relevant sequence P is registered as being unrecoverable in the past is investigated. If this P is registered as being unrecoverable, the registry of "unrecoverability" is erased. Further, in order to enhance the data-base use efficiency as in the above-mentioned embodiment, the inclusion relationship between the recovery sequence P and other recovery sequence is confirmed in step 910 (which confirmation processing will be described later with reference to FIG. 10).

The confirmation processing of this inclusion relationship is to produce an includible statistically more rational characterizing data set according to the characterizing data set (P, n, $\mu$, $\Sigma$) including the now determined normalized recovery sequence P, and to update the former characterizing data set by the latter data set. Through performance of step 1001 to step 1006, characterizing data set (P', n', $\mu$', $\Sigma$') regarding other recovery sequence P' than the now determined normalized recovery sequence P are sequentially taken out from the data base. Namely, a c number of characterizing data sets are sequentially investigated and determined from the 1st to the (c)th characterizing data set. Subsequently, in step 1007, what extent of statistical differences exists between $\Sigma$ and $\Sigma$' and between $\mu$ and $\mu$' are investigated by performing $\Lambda$ and $T^2$ statistical tests thereon. As a result, if in step 1008 no difference can be regarded to exist between $\Sigma$ and $\Sigma$' and between $\mu$ and $\mu$', the system in step 1009 asks the operator whether or not the failure removal processing performed by the always existent recovery sequence P' may be represented in the data base by the failure removal processing performed by the new recovery sequence P. If the operator's answer is yes (step 1010), the rule for converting P' to P is added to the previously mentioned normalized rule (step 1011). Subsequently, in this FIG. 10 flowchart, the characterizing data set (P, n, $\mu$, $\Sigma$) previously newly registered in the FIG. 9 processing operation flowchart is corrected and registered as more widely available characterizing data set (P, n", $\mu$", $\Sigma$"). First, in step 1012, n' is added to n whereby n" is set to be (n+n'). Then, calculation of (n$\mu$+n'$\mu$')/n" is performed whereby $\mu$" is set to be (n$\mu$+n'$\mu$')n". Subsequently, in step 1013, the variance covariance matrix $\Sigma$" is newly calculated. Note here that the matrix $\Sigma$" is a d-dimensional (d: dimensional number of s) square matrix ($\delta$"ij) and each element $\delta$"ij is determined by the equation $\delta$"ij=((n−1)$\delta$ij+n$\mu$i$\mu$j+(n'−1)$\delta$"ij+n'$\mu$'i$\mu$'j−n"$\mu$"i$\mu$"j)/(n"−1), where $\delta$'ij represents the (i)th row/(j)th column element (1≦i, j≦d) of $\Sigma$" and $\mu$"i and $\mu$"j represent the (i)th element and the (j)th element of $\mu$", respectively. Finally, in step 1014, the characterizing data set (P, n, $\mu$, $\Sigma$) in the base data is updated by the characterizing data set (P, n", μ", Σ"), and the characterizing data set in the data base that corresponds to the already existent recovery sequence P' is deleted. The learning process ends in the above-mentioned way.

The teaching operation which is performed when the associated-portion state data items within an equipment have been supplied as a result of failure occurrence will now be explained with reference to FIG. 11. This teaching operation processing is directed to searching for a recovery sequence in the data base that can be adopted as a teachable recovery sequence, and, if such a recovery sequence exists therein, to display it to the operator. In the process of from step 1101 to step 1105, a c number of characterizing data sets in the data base are sequentially taken out from the 1st to the (c)th data set and investigated and determined. Regarding the characterizing data set (P, n, μ, Σ) thus taken out, in the process of from step 1106 to step 1109, when Σ is a nonsingular matrix, determination is made of the degree of the statistical approximation between the relevant associated-portion state vector s and the registered failure state average vector μ, and made of the probability as to the adequacy of the recovery sequence resulting therefrom. By this determination, this processing is intended to teach the operator so as for him to recover the failure by a recovery sequence as accurate as possible. With the associated-portion state vector s having a dimensional number of d (step 1107), in step 1108, the degree of deviation between the associated-portion state vector s and the failure state average vector μ is calculated, as a Mahalanobis distance, using the variance covariance matrix Σ. Namely, the row vector $'(s-\mu)$ of a transposed vector is formed regarding a column vector $(s-\mu)$ whose element is a difference between each element of the associated-portion state vector s and a corresponding element of the failure state average vector μ. Then, with an inverse matrix of $\Sigma^{-1}$ of the variance covariance matrix Σ being interposed between the both vectors, vector-multiplification of $D^2 = '(s-\mu) \Sigma^{-1} (s-\mu)$ is performed to determine the square of the Mahalanobis distance D. Subsequently, in step 1109, the probability p that the square of the Mahalanobis distance, as measured from μ, of the associated-portion state vector that would follow the distribution thereof with respect to the failure expressed by the characterizing data set becomes greater than the $D^2$ determined as above, is determined from the $\chi^2$ distribution of the freedom degree d. As a result, regarding the relevant characterizing data set in which this probability p is greater than 0.5 that has been arbitrarily given as a decision standard (step 1110), the relevant recovery sequence P and the probability p of adequacy thereof are displayed in step 1111 and taught to the operator. This decision probability limit value can be so designed as to be selected to be an operator's desired value. Or alternatively, that value can be also so designed that another form of algorism (for example, a larger value may be used in corresponding relation to the largeness in number of the failure pieces registered in the data base) may be contained in the system and the value may be produced in the system per se.

In the above-explained recovery techniques of FIGS. 9 to 11, since the recovery processing is statistically performed, the most adequate possible recovery sequence can be taught in regard to each of various kinds of failure pieces expressed in analog quantity as well. Therefore, such recovering technique are very useful.

Further, other failure decision processes than those explained here include various pattern-recognition processes, for example, a statistical process such as clustering. Also, they further include neural net, genetic algorism, and the like. Using these decision processes, characteristics extraction, available recovery sequence determination, etc. can be performed.

According to the present invention as explained above, since normalization of recovery sequence and analyses of data are performed through automatic learning, it is possible to give an accurate teaching with respect to many kinds of failure state with the use of a small scale of data base.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. A failure-recovering sequential procedure teaching system comprises:

a failure removal data recording section which records as a set of failure removal data an associated-portion state data representing prescribed associated-portion states at the time when the equipment to be controlled is in failure and a recovery sequence data representing a recovery sequencial procedure with which an operator performs his recovering operation;

a failure removal data analysis section which selects one or a plurality of associated-portion state data items corresponding to the same recovery sequence data among a plurality of sets of failure removal data and groups them as data of the same recovery sequence data, analizes said associated-portion state data in each recovery sequence group to produce failure-characterizing data typically representing the characteristics of the relevant failure state, and records the failure-characterizing data as the data paired with the corresponding recovery sequence data; and a recovery sequence determination section which compares the corresponding associated-portion state data with each item of the failure-characterizing data as stored to determine the degree of match between an item of said corresponding associated-portion state data when a new piece of failure occurs and outputs the recovery sequence data corresponding to a high match-degree item of the failure-characterizing data.

2. A failure-recovering sequential procedure teaching system as set forth in claim 1, wherein said failure removal data recording section records said recovery sequence data which have been normalized in accordance with a normalization rule representing as a single sequential-order operation-step chain formed by commonizing a plurality of operation steps eventually bringing about the same operation effects even when such operation steps are different from each other.

3. A failure-recovering sequential procedure teaching system as set forth in claim 2, wherein said failure removal data analysis section adds a normalization rule for converting another recovery sequence to a certain recovery sequence and merges said another recovery sequence into said certain recovery sequence in case said failure-characterizing data corresponds to said certain recovery sequence includes the failure-characterizing data corresponding to said another recovery sequence.

4. A failure-recovering sequential procedure teaching system as set forth in claim 1, wherein said failure removal data analysis section converts said associated-portion state data into vectors, and generates failure state vectors including as its elements common data items of the associated-portion state data falling within the recovery sequence group and mask vectors having data items for excluding data item elements other than such common data-item elements, so that said failure state vector and the mask vector paired therewith are processed as the failure-characterizing data while automatically learning from the failure occurrence and recovery operations.

5. A failure-recovering sequential procedure teaching system as set forth in claim 4, wherein said failure removal data analysis section processes as said failure characterizing data a total number of all failure state vectors corresponding to a same recovery sequence and a mean value thereof and a set of data composed of variance covariance matrix or a set of data necessary for deriving those data.

6. A method of teaching failure-recovering sequential procedure comprising steps of:

recording as a set of failure removal data an associated-portion state data representing prescribed associated-portion state at time when an equipment to be controlled is in failure and a recovery sequence data representing a recovery sequencial procedure with which an operator performs his recovering operation;

selecting one or a plurality of associated-portion state data items corresponding to same recovery sequence data among a plurality of sets of said failure removal data;

grouping said associated-portion state data items as data of said same recovery sequence data;

analyzing said associated-portion state data in each group of said recovery sequence data to produce failure-characterizing data typically representing characteristics of a relevant failure state; and recording said failure-characterizing data as data paired with corresponding data of said recovery sequence data;

comparing said corresponding associated-portion state data with each item of said recorded failure-characterizing data to determine degree of match between an item of said corresponding associated-portion state data when a new piece of failure occurs; and outputting said recovery sequence data corresponding to a high match-degree item of said failure-characterizing data.

7. A method as set forth in claim 6, wherein said step of recording said recovery sequence data comprises steps of:

commonizing a plurality of operation steps included in said recovery sequence data eventually bringing about the same operation effects even when such operation steps are different from each other; and standarding said recovery sequence data in accordance with a normalization rule representing as a single sequential-order operation-step chain.

8. A method as set forth in claim 7, wherein said step of standardizing said recovery sequence data comprises steps of:

adding a normalization rule for converting another recovery sequence to a certain recovery sequence; and merging said another recovery sequence into said certain recovery sequence in case said failure-characterizing data corresponds to said certain recovery sequence includes the failure-characterizing data corresponding to said another recovery sequence.

9. A method as set forth in claim 6, wherein said step of recording a set of failure removable data further comprises steps of comverting said associated-portion state data into vectors, and generating failure state vectors including as its elements common data items of the associated-portion state data falling within the recovery sequence group and mask vectors having data items for excluding data item elements other than such common data-item elements; and said step of recording failure characterizing data comprises a step of processing said failure state vector and said mask vector paired therewith as failure-characterizing data.

10. A method as set forth in 9, wherein said step of failure state vetor comprises a step of processing as said failure characterizing data a total number of all failure state vectors corresponding to a same recovery sequence and a mean value thereof and a set of data composed of variance covariance matrix or a set of data necessary for deriving those data.

* * * * *

UNITED STATES PATENT AND TRADEMARK OFFICE
CERTIFICATE OF CORRECTION

PATENT NO. : 5,590,036
DATED : December 31, 1996
INVENTOR(S) : MAEDA

It is certified that error appears in the above-indentified patent and that said Letters Patent is hereby corrected as shown below:

On the title page:

Please change:

"[30]      Foreign Application Priority Data
     June 1, 1994 [JP]      Japan ............. 6-120404"

TO

--[30]      Foreign Application Priority Data
     June 1, 1994 [JP]      Japan............. 6-120404
     April 4, 1995 [JP]     Japan............. 7-079204 --

Signed and Sealed this

Twenty-sixth Day of August, 1997

Attest:

BRUCE LEHMAN

*Attesting Officer*     Commissioner of Patents and Trademarks